No. 865,915. PATENTED SEPT. 10, 1907.
N. KOCH.
VALVE.
APPLICATION FILED MAR. 22, 1906.
2 SHEETS—SHEET 1.
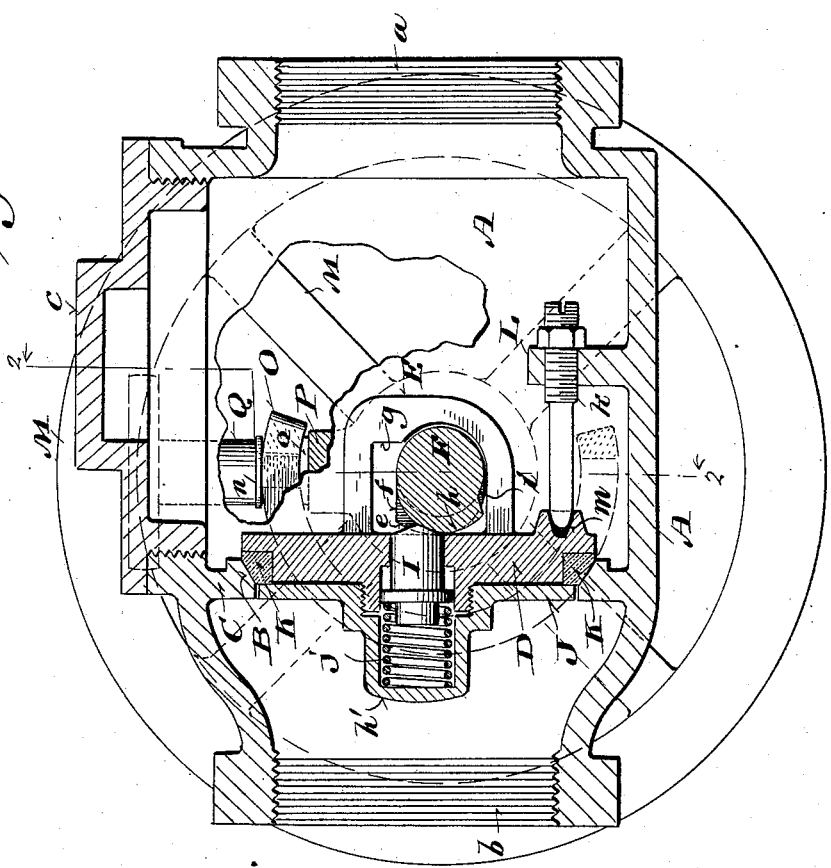

No. 865,915. PATENTED SEPT. 10, 1907.
N. KOCH.
VALVE.
APPLICATION FILED MAR. 22, 1906.
2 SHEETS—SHEET 2.
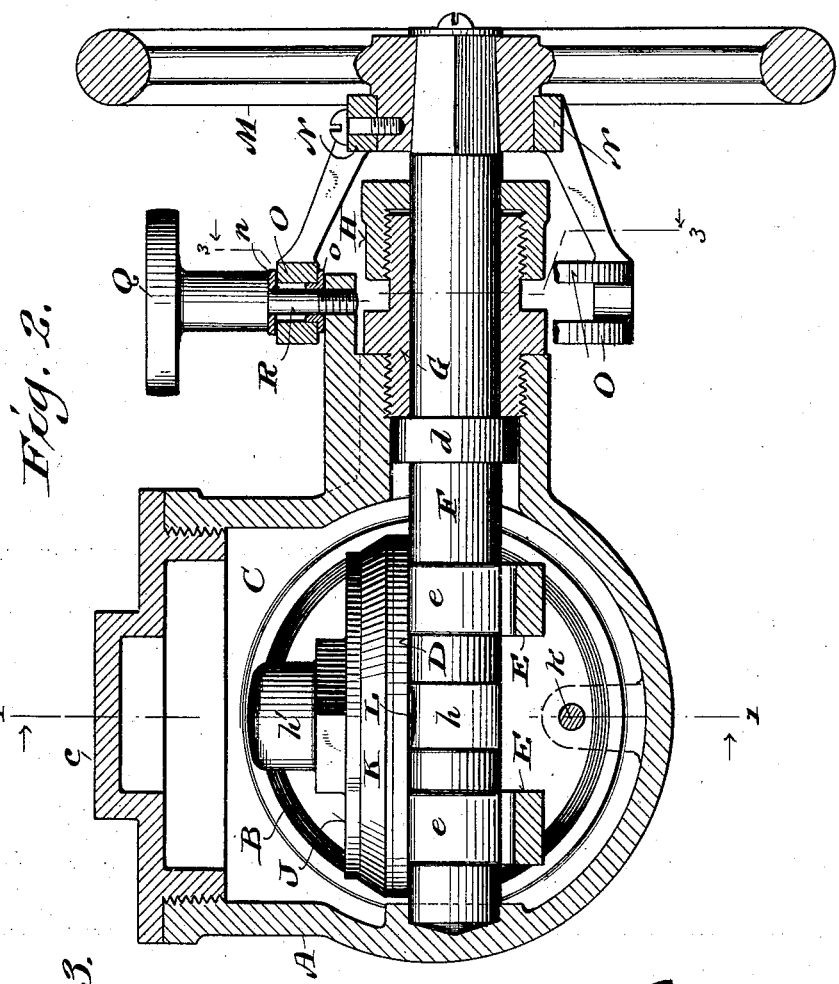
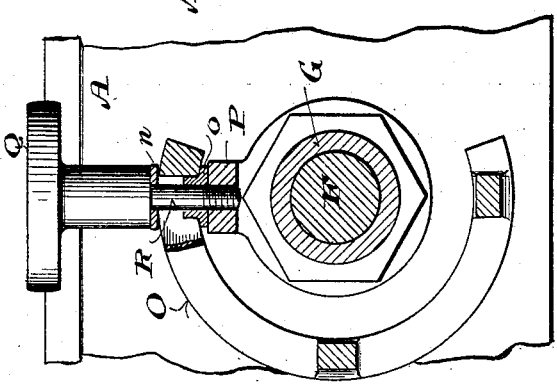

UNITED STATES PATENT OFFICE.

NICHOLAS KOCH, OF MILWAUKEE, WISCONSIN, ASSIGNOR TO GEORGE H. CROWNS, OF PORT WASHINGTON, WISCONSIN.

VALVE.

No. 865,915.          Specification of Letters Patent.          Patented Sept. 10, 1907.

Application filed March 22, 1906. Serial No. 307,370.

*To all whom it may concern:*

Be it known that I, NICHOLAS KOCH, a citizen of the United States, and a resident of Milwaukee, in the county of Milwaukee and State of Wisconsin, have invented certain new and useful Improvements in Valves; and I do hereby declare that the following is a full, clear, and exact description thereof.

The improvements consist in what is herein shown, described and claimed; the object of the invention being to provide simple, economical valves of the butterfly type having the advantageous features hereinafter specified.

In the drawings: Figure 1 represents a section view of a valve in its closed position, embodying the features of my invention; the section being indicated by lines 1—1 of Fig. 2; Fig. 2, a cross-section of the same upon line 2—2 of Fig. 1, the valve being shown in its full open position, and Fig. 3, a detail section view of the locking mechanism, the section being indicated by line 3—3 of Fig. 2.

Referring by letter to the drawings, A represents a valve casing of the globe-type having threaded inlet and outlet openings $a$, $b$, respectively, and a hand hole fitted with a threaded cap $c$ through which access is had to the valve. A tapered valve seat B is formed in a wall C of the casing for the reception of a butter-fly valve which comprises a disk D having loop extensions E through which a valve stem F passes. The valve stem at its inner end is socketed into a recess in the valve casing, the outer end thereof projecting through a gland G which gland is threaded into an opening in the side of said valve casing and has a packing cap H threaded over its end. The stem F is held against end movement by a collar $d$ and coincident with the loops E of the valve-disk said stem is provided with raised cam lugs $e$, which serve to exert a closing pressure upon the disk when the latter is seated, a flat face $f$ of the lug being arranged to engage a corresponding face $g$ of said loops when the stem is turned to open the valve. A central cam-lug $h$ projects from the face of the stem F for engagement with a plug L carried by the valve-disk. The plug serves to lock said valve-disk to the stem when the latter is turned a quarter of a revolution, by engaging a depression $i$ in the lug $h$, at which time faces $f$ of lugs $e$ strike the faces $g$ of the loops, thus securely holding the disk to the stem under tension of a spring $j$. The spring forces the plug downward upon the disk, locking these parts together so that the stem and disk may be revolved to open the valve. The spring $j$ is housed in a cap $h'$ of a retaining-plate J, which plate is threaded upon a shank of the disk D and serves as a retainer for a tapered gasket K fitted into a recessed face of said disk.

By the above described construction it will be seen that plate J not only serves as a housing for the spring plug, but also retains the gasket which is of some soft material suitable for a perfect seat, that when worn, may readily be replaced.

Threaded into a lug L of the valve casing is a set-screw $k$, the end of which is arranged to engage a pocket $m$ of the disk when the latter is in its closed position, and when it is desired to close the valve-disk, this set-screw K acts as a fulcrum for the same while the valve-stem makes a quarter revolution, in order to compress the spring-plug I, in the meantime said valve-disk is being rocked to its seat on the set-screw fulcrum.

A hand-wheel M is secured to the end of the valve-stem, the hub of which has secured thereto a ring N of a spider, the arms of which carry a slotted segment O, this segment is offset so as to pass over an ear P extending from the valve casing. A binding wheel Q having a shouldered shank R, passes through the slot in the segment and is threaded into the ear P, there being suitable washers $n$, $o$, above and below the segment, as is best shown in Fig. 2, of the drawings.

By the above described mechanism it is obvious that when the valve is opened, it may be locked in any position from a full opening to a slight leak, by simply turning the binding wheel Q, which thereby securely locks the valve stem by friction to the casing through the segment and ear P thereof. The valve casing as herein described having a coinciding valve seat with inlet and outlet openings, will thereby permit a straight flow of fluid therethrough, which thus reduces the friction to a minimum.

I claim:—

1. In a valve of the butterfly type, comprising a casing having a valve-seat therein, a valve-disk for engagement with the seat, loops extending therefrom, a stem loosely fitted in the loops, a spring-plug carried by the disk for engagement with the stem, a hand-wheel fast on the stem, a ring secured to the wheel, spider-arms extending from the ring, a slotted segment carried by the spider-arms, an ear projecting from the valve-casing, and a clamping-wheel in shouldered-engagement with the slotted segment and threaded into the valve-casing ear.

2. In a valve of the butterfly type, comprising a casing having a valve-seat therein, a valve-disk for engagement with the seat, loops extending therefrom, a stem loosely fitted in the loops, a spring-plug carried by the disk for engagement with the stem, a hand-wheel fast on the stem, spider-arms extending from the hand-wheel, a slotted segment carried by the spider-arms, an ear projecting from the valve-casing, and a clamping-wheel arranged to engage
5 the slot of the segment, in threaded-connection with said valve-casing ear.

3. In a valve of the butter-fly type, a valve disk, a gasket fitted into a recess therein, a central spring plug carried by the disk, and a cap in threaded connection with said disk, said cap having a central recess for the spring 10 plug and arranged to engage the gasket.

In testimony that I claim the foregoing I have hereunto set my hand at Milwaukee in the county of Milwaukee and State of Wisconsin in the presence of two witnesses.

NICHOLAS KOCH.

Witnesses:
GEO. W. YOUNG,
FRED PALM.